United States Patent
Headley et al.

(10) Patent No.: US 8,485,504 B2
(45) Date of Patent: Jul. 16, 2013

(54) APPARATUS FOR SUPPORTING INTERNALS WITHIN A MASS TRANSFER COLUMN AND PROCESS INVOLVING SAME

(75) Inventors: Darran Matthew Headley, Valley Center, KS (US); Billy Russ Unruh, Andover, KS (US)

(73) Assignee: Koch-Glitsch, LP, Wichita, KS (US)

( * ) Notice: Subject to any disclaimer, the term of this patent is extended or adjusted under 35 U.S.C. 154(b) by 25 days.

(21) Appl. No.: 13/356,065

(22) Filed: Jan. 23, 2012

(65) Prior Publication Data

US 2012/0228251 A1 Sep. 13, 2012

Related U.S. Application Data

(60) Provisional application No. 61/450,689, filed on Mar. 9, 2011.

(51) Int. Cl.
*B01F 3/04* (2006.01)
(52) U.S. Cl.
USPC .................................. 261/114.1; 261/114.5
(58) Field of Classification Search
USPC ........................................... 261/114.1, 114.5
See application file for complete search history.

(56) References Cited

U.S. PATENT DOCUMENTS

| 2,860,860 A * | 11/1958 | Wilson ........................... 261/113 |
| 2002/0194795 A1 | 12/2002 | Spite |
| 2008/0073881 A1 | 3/2008 | Bennett |
| 2009/0072098 A1 | 3/2009 | Smallhorn |

FOREIGN PATENT DOCUMENTS

KR 10-2010-0102798 A 9/2010

OTHER PUBLICATIONS

Search Report and Written Opinion dated Sep. 3, 2012, in International Patent Application No. PCT/US2012/022570; International Filing Date: Jan. 25, 2012; Applicant: Koch-Glitsch, LP.

* cited by examiner

*Primary Examiner* — Robert A Hopkins
(74) *Attorney, Agent, or Firm* — Hovey Williams LLP

(57) ABSTRACT

An elongated support beam is provided for supporting internals such as liquid collectors, liquid distributors, packing supports, or trays within a mass transfer column. The support beam is divided longitudinally into a lower beam segment and an upper beam segment that are joined together by a plurality of connectors at one or more longitudinally spaced-apart positions. The connectors serve to stiffen and resist lateral deflection of the lower and upper beam segments in relation to each other and to transfer the load carried by the upper beam segment to the lower beam segment or vice-versa. By dividing the support beam into lower and upper beam segments, each of the lower and upper beam segments can be passed through a manway opening in a shell of the mass transfer column prior to assembly of the support beam or following disassembly of the support beam within the mass transfer column.

18 Claims, 9 Drawing Sheets

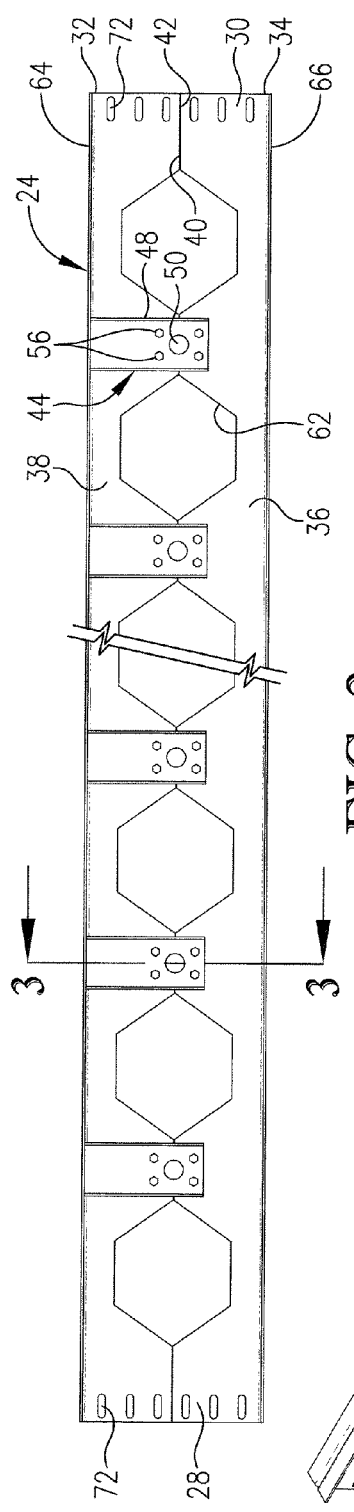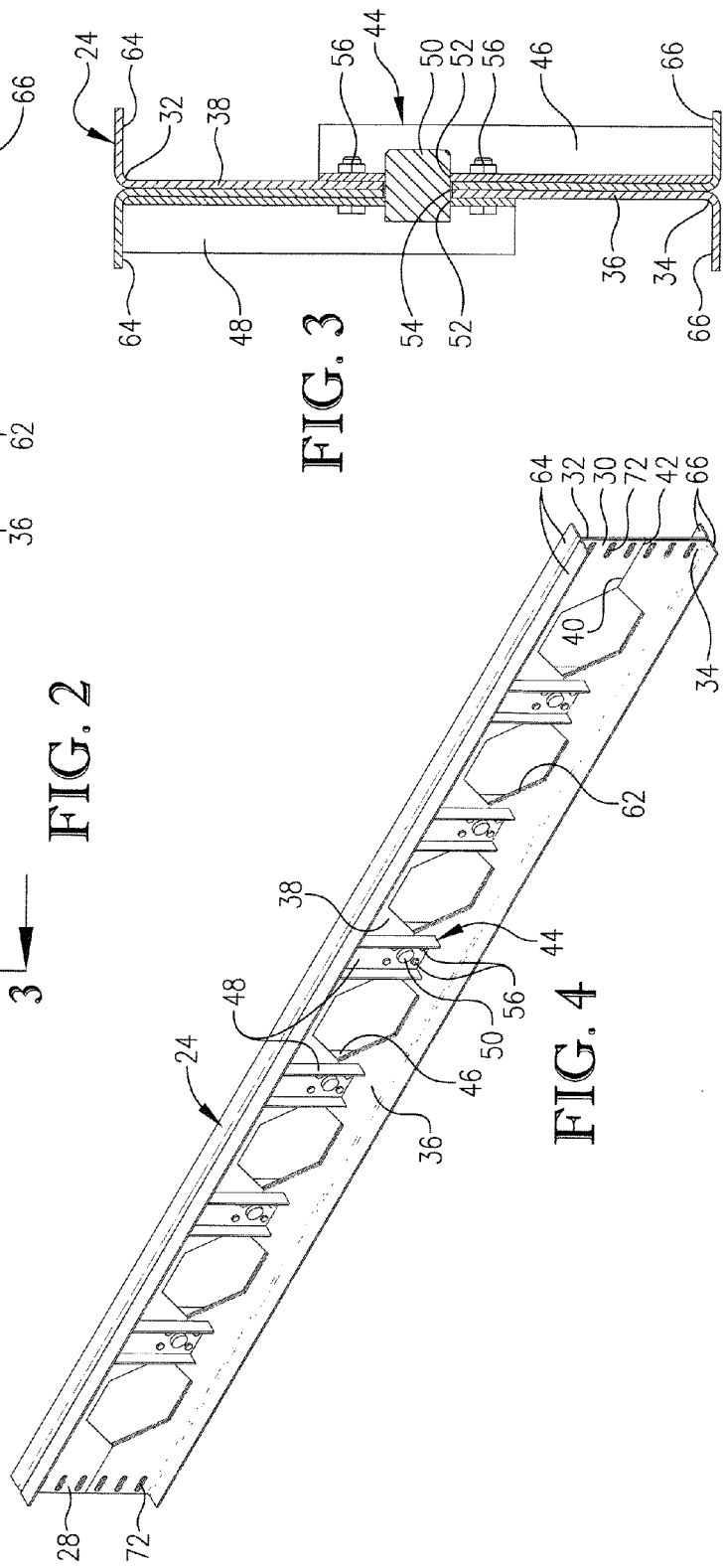

APPARATUS FOR SUPPORTING INTERNALS WITHIN A MASS TRANSFER COLUMN AND PROCESS INVOLVING SAME

BACKGROUND OF THE INVENTION

The present invention relates generally to apparatus for supporting internals such as liquid collectors, liquid distributors, packing supports, and vapor-liquid contact devices in columns in which mass transfer and/or heat exchange processes occur and to methods for assembly of the apparatus.

Various types of internals are used in mass transfer and heat exchange columns to facilitate the desired interaction between fluid streams flowing in countercurrent relationship within the open internal region within the column. The term mass transfer column as used herein is not intended to be limited to columns in which mass transfer is the primary objective of the processing occurring within the column, but is also intended to encompass columns in which heat transfer rather than mass transfer is the primary objective of the processing. The internals used within mass transfer columns include liquid collectors, liquid distributors, packing supports, and trays that extend across the horizontal cross section of the column and are supported on rings, bolting bars or other structures fixed or otherwise secured to the inner surface of the column shell.

In larger diameter columns, supports in the nature of beams and trusses are commonly used to resist the deflection or sagging of the internals that would otherwise result from the weight of the internals and the loads exerted on the internals by the fluid streams. This sagging of the internals is generally undesirable because it causes fluid maldistribution as the fluid stream tends to flow toward and pool at the low portion of the internal rather than flowing in the desired uniform manner across or within the internal. These supports are typically fixed at their opposite ends to the column shell and extend horizontally across the open internal region of the column in parallel, spaced-apart relationship. The internal then rests on a top surface of the supports or on lower flanges provided on the supports.

An opening with a closeable cover, known as a manway, is provided in the shell of the mass transfer column to allow a person to enter the column for installation, inspection and servicing of the column internals. A manway is also used to allow passage of the internals through the column shell during initial installation of the internals and during revamping of the column. The size of the manway dictates the size of the internals that can be passed through the manway. For this reason, the internals are typically fabricated in multiple segments that are each small enough to pass through the manway. The internals are then assembled within the column by bolting or welding the individual segments together. The internals can be disassembled in the reverse operation.

During the initial construction of larger-diameter mass transfer columns, the shell is often assembled in sections, with the internals being easily installed through the open top of the associated shell section without the size constraints presented by the manway. Nonetheless, it may be desirable to assemble the internals for these columns from segments that are sized to fit through the manway to allow the internals to be disassembled and removed from the column during later revamping of the column.

It is generally undesirable to use bolts to secure individual segments of the supports together in larger-diameter mass transfer columns because the high loads carried by the supports may cause enough deflection in the support to expose some bolts to a high enough shear force to cause failure of the bolts. Upon failure of these bolts, a higher shear force is then shifted to other bolts and a progression of bolt failures may occur that could lead to greater deflection and ultimately collapse of the support and the associated internal. Welding the support segments together reduces this risk of deflection and collapse, but welding requires more specialized installation personnel than is required when bolting the segments together. In addition, welding the support segments together may not be an available option within certain columns, such as during a column revamp when the residues from the processing that has occurred in the column present a risk of fire or explosion. A need has thus developed for support segments that can be assembled in a manner that overcomes the problems discussed above.

SUMMARY OF THE INVENTION

In one aspect, the present invention is directed to an elongated support beam for supporting an internal such as a liquid collector, liquid distributor, packing support, or a tray within an open internal region within an upright mass transfer column. The support beam has opposed ends, opposed faces, a top edge, a bottom edge, and a longitudinal length extending between the opposed ends.

The support beam is divided longitudinally into a lower beam segment and an upper beam segment having longitudinally-extending facing edges. The facing edges may extend linearly or they may be of a sinusoidal or other desired pattern. The lower and upper beam segments are joined together by one or more connectors at one or more longitudinally spaced-apart positions. The connectors serve to stiffen and resist lateral deflection of the lower and upper beam segments in relation to each other and to transfer the load carried by the upper beam segment to the lower beam segment or to transfer the load carried by the lower beam segment to the upper beam segment. The spacing between the connectors may be uniform or the connectors may be more closely spaced in certain regions where the support beam is subjected to greater stresses or as a result of physical interference from other column internals.

In one embodiment, each connector comprises a first bracket that extends along one face of both the lower and upper beam segments and is secured to the lower beam segment and a second bracket that extends along the opposite face of the lower and upper beam segments and is secured to the upper beam segment.

Some or all of the connectors include a load transferring pin that extends through aligned indexing holes in the first and second brackets and a hole formed in one or both of the lower and upper beam segments. The indexing holes are positioned and the load transferring pin is sized so that the load transferring pin when inserted through aligned holes causes the facing edges of the lower and upper beam segments to be spaced apart a preselected distance to facilitate assembly of the support beam. As a result of the spacing between the lower and upper beam segments, the entire load carried by the upper beam segment is transferred to the lower beam segment, or vice-versa, through the connectors. The load transferring pin is preferably fixed to one, but not both, of the first and second brackets so that the upper and lower beam segments can be separated from each other without having to first disconnect the load transferring pin. The load transferring pin is constructed from a metal or other material having sufficient shear strength to withstand the shear forces applied to the pin when the support beam is fully loaded during operation of the column.

Each connector may also include a first fastener extending through aligned holes in the first and second brackets and a first hole formed in the lower beam segment. Each connector may also include a second fastener extending through additional aligned holes in the first and second brackets and a second hole formed in the upper beam segment. The fasteners are intended to resist lateral displacement of the upper beam segment in relation to the lower beam segment.

To facilitate passage of the separated lower and upper beam segments through a manway opening in the column shell, the first and second brackets in one embodiment do not extend the full height of the support beam. The first and second brackets overlap the junction between the upper and lower beam segments and have a length that allows the first and second brackets to extend along a sufficient portion of the height of the support beam to provide the desired resistance to displacement and deflection of the upper and lower beam segments, while still permitting the individual upper and lower beam segments to be passed through the manway. In order to provide greater resistance to lateral displacement of the upper beam segment in relation to the lower beam segment, the first bracket overlaps more of the first face of the lower beam segment than the first face of the upper beam segment and the second bracket overlaps more of the second face of the upper beam segment than the second face of the lower beam segment. As an example, the first brackets may extend along the full height of the lower beam segment and approximately one-quarter of the height of the upper beam segment and the second brackets may extend along the full height of the upper beam segment and approximately one-quarter of the height of the lower beam segment. The first and second brackets may be of any suitable form, such as U-shaped channels that are positioned with their legs or flanges extending outwardly from the associated face of the upper and lower beam segments.

The upper and/or lower beam segments may include cut-outs that reduce the weight of the support beam and create openings to allow fluid streams to pass laterally through the support beam. An outwardly-extending flange or flanges may be positioned at the top edge of the support beam to provide a broader support surface for the internal being supported by the support beam. One or more outwardly-extending flanges may be positioned at or near the bottom edge of the support beam to provide additional support surfaces for a second internal supported by the support beam.

In another aspect, the present invention is directed to a column internal supported within an open internal region of a mass transfer column by a plurality of the support beams described above positioned in parallel-extending relationship.

In a further aspect, the present invention is directed to a method of preparing the support beam described above. The method includes the steps of first forming the connector by temporarily positioning the upper and lower beam segments in the desired alignment or registration with each other, positioning a first bracket along one face of the lower and upper beam segments and a second bracket along an opposite face of the lower and upper beam segments in general alignment with the first bracket, inserting a load transferring pin through aligned indexing holes in the first and second brackets and a hole in the lower and/or upper beam segment, securing the first bracket to the lower beam segment and the second bracket to the upper beam segment, and securing the load transferring pin to either the first or second bracket. Aligned holes may also be formed in the first and second brackets and the lower and upper beam segments for receiving fasteners.

In yet another aspect, the present invention is directed to a method of assembling the support beam described above within a mass transfer column. The method comprises the steps of passing the separated lower and upper beam segments through a manway opening in a shell of the mass transfer column, bringing the lower and upper beam segments into longitudinally-extending alignment, inserting the load transferring pin through the hole in the lower beam segment and/or the upper beam segment and then through the indexing hole in the first or second bracket to which it has not already been secured, inserting a fastener through the aligned holes, and securing the fastener to the first and second brackets. The support beam may be secured to the shell of the mass transfer column during or after assembly of the support beam.

BRIEF DESCRIPTION OF THE DRAWINGS

FIG. 2 is a fragmentary side elevation view of a support beam constructed in accordance with one embodiment of the present invention;

FIG. 3 is an end elevation view of the support beam taken in vertical section along line 3-3 in FIG. 2 to show details of the connector that joins the upper and lower beam segments;

FIG. 4 is a top perspective view of the support beam;

DETAILED DESCRIPTION

Figure 1:
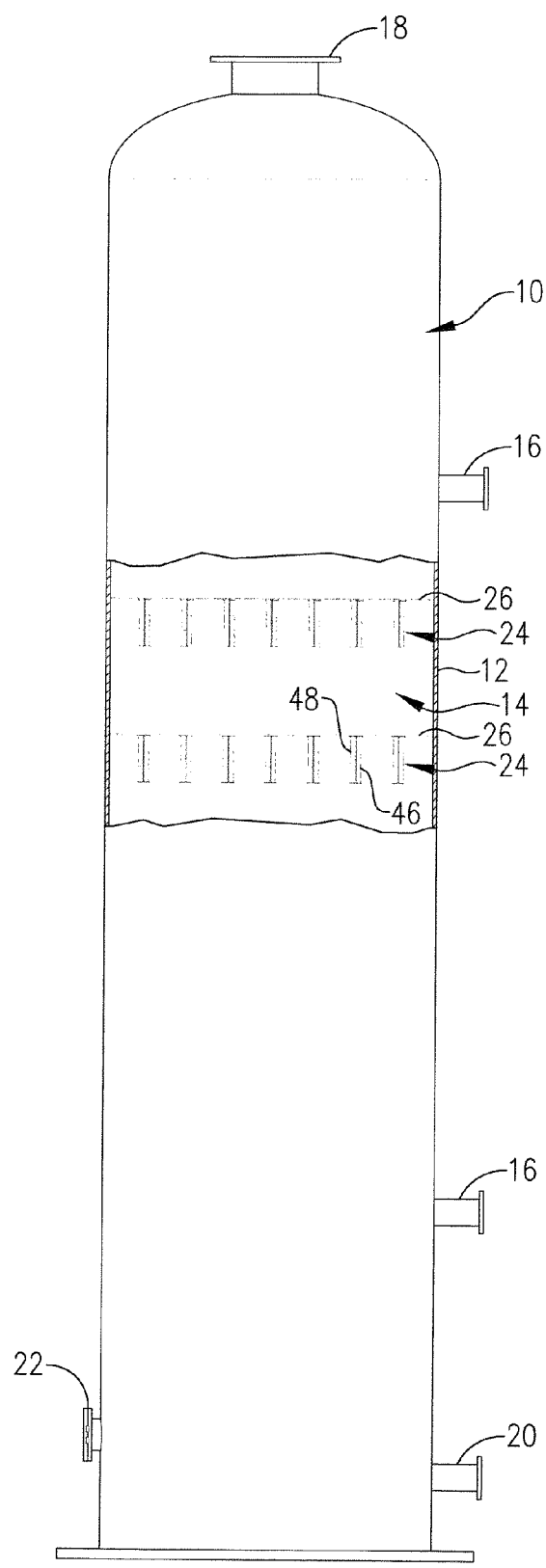
FIG. 1 is a side elevation view of a column in which mass and/or heat transfer are intended to occur and in which a portion of the column shell is broken away to show the support beams of the present invention.
Figure 5:
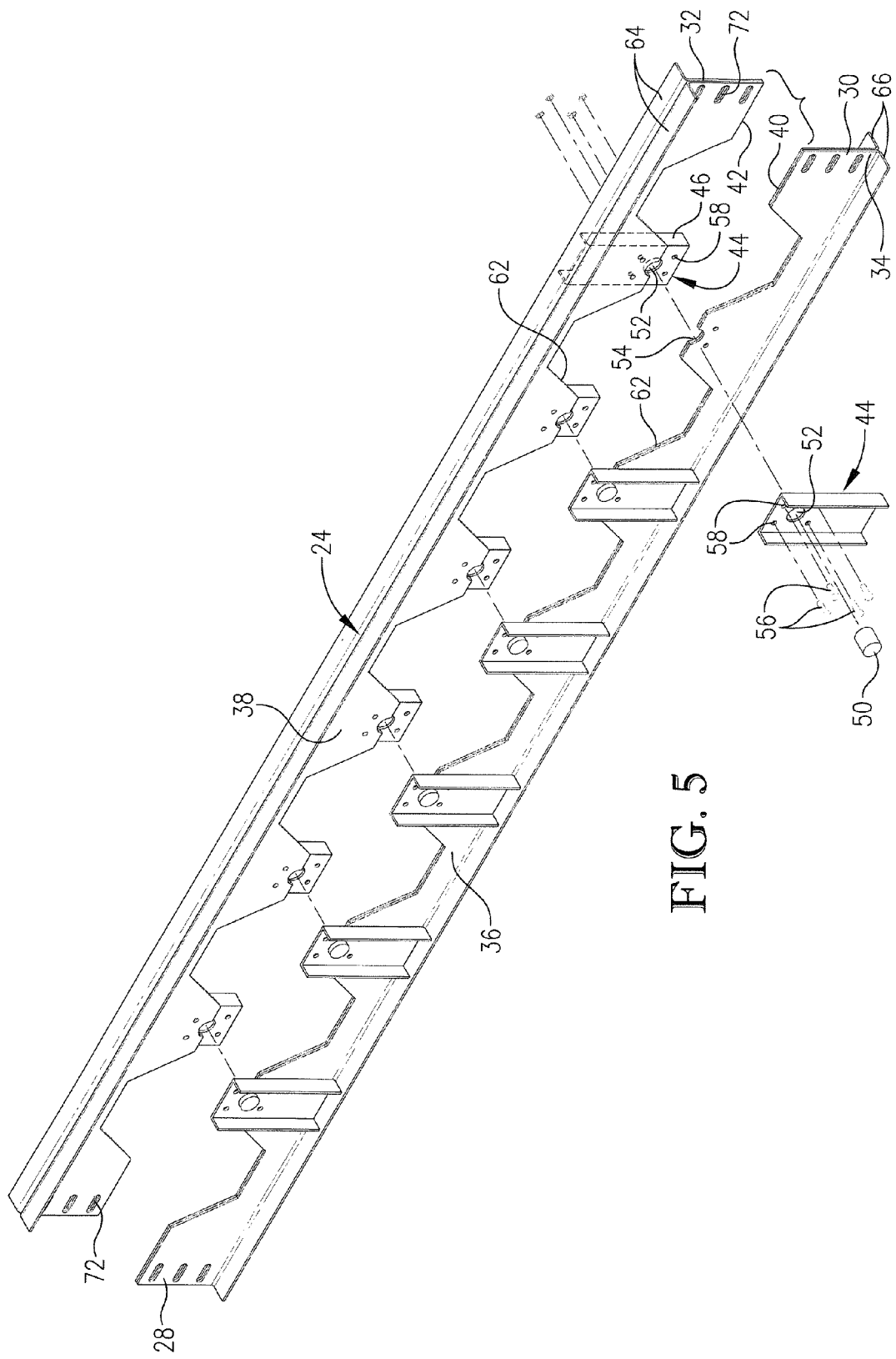
FIG. 5 is a partially-exploded perspective view of the support beam.
Figure 6:
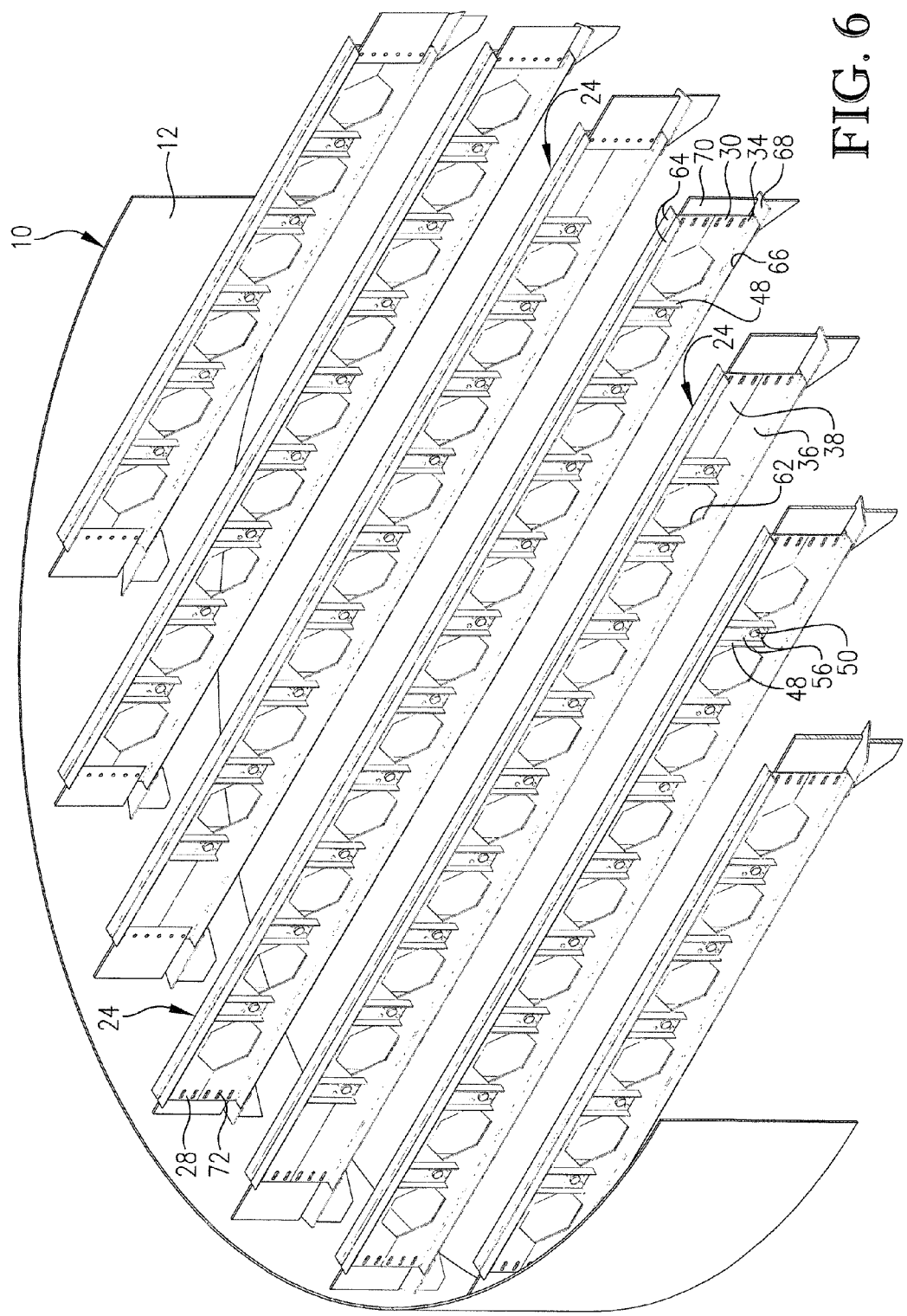
FIG. 6 is a fragmentary perspective view of the column showing a number of the support beams mounted within the column.

Turning now to the drawings in greater detail and initially to FIG. 1, a mass transfer column suitable for use in processes in which mass transfer and/or heat exchange is intended to occur between countercurrent-flowing fluid streams is represented generally by the numeral 10. Mass transfer column 10 includes an upright, external shell 12 that is generally cylindrical in configuration, although other orientations, such as horizontal, and configurations, including polygonal, are possible and are within the scope of the present invention. Shell 12 is of any suitable diameter and height and is constructed from one or more rigid materials that are desirably inert to, or are otherwise compatible with the fluids and conditions present during operation of the mass transfer column 10.

Mass transfer column 10 is of a type used for processing fluid streams, typically liquid and vapor streams, to obtain fractionation products and/or to otherwise cause mass transfer and/or heat exchange between the fluid streams. For example, mass transfer column 10 can be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, and other processes occur.

The shell 12 of the mass transfer column 10 defines an open internal region 14 in which the desired mass transfer and/or heat exchange between the fluid streams occurs. Normally, the fluid streams comprise one or more ascending vapor streams and one or more descending liquid streams. Alternatively, the fluid streams may comprise both ascending and descending liquid streams or an ascending gas stream and a descending liquid stream.

The fluid streams are directed to the mass transfer column 10 through any number of feed lines 16 positioned at appropriate locations along the height of the mass transfer column 10. One or more vapor streams can also be generated within the mass transfer column 10 rather than being introduced into the mass transfer column 10 through the feed lines 16. The mass transfer column 10 will also typically include an overhead line 18 for removing a vapor product or byproduct and a bottom stream takeoff line 20 for removing a liquid product or byproduct from the mass transfer column 10. Other column components that are typically present, such as reflux stream lines, reboilers, condensers, vapor horns, and the like, are not illustrated in the drawings because they are conventional in nature and an illustration of these components is not believed to be necessary for an understanding of the present invention.

The mass transfer column 10 includes a manway 22 that provides a closeable opening of a preselected diameter through the shell 12 to allow persons to enter and exit the internal region 14 within the mass transfer column 10, such as for installation, inspection, and repair or replacement of internals positioned within the mass transfer column 10. The manway 22 also serves to allow component parts of the various column internals to be passed through the manway 22 during installation or removal of the internals. The manway 22 is shown positioned near the bottom of the mass transfer column 10 to allow persons to access the manway 22 without the use of ladders or scaffolds, but the manway 22 or multiple manways 22 can be positioned at other locations.

Two groups of support beams 24 of the present invention are positioned within the open internal region 14 of the mass transfer column 10 at vertically-spaced apart locations. Each group of support beams 24 is shown supporting on their upper surfaces a contact tray 26 of conventional design. It is to be understood that the contact trays 26 are merely representative of one type of column internal that can be supported by the support beams 24 in accordance with the present invention. Other column internals useable in the present invention include, but are not limited to, liquid collectors, liquid distributors, and structured and random packing supports.

The support beams 24 within each group extend in parallel and sideways-spaced-apart relationship across the horizontal cross section of the mass transfer column 10. Because of the circular configuration of the column shell 12, the support beams 24 have differing longitudinal lengths corresponding to the chordal distance across the mass transfer column 10 at the location at which each support beam 24 is positioned.

Turning additionally to FIGS. 2-6, in one embodiment, each support beam 24 has opposed ends 28 and 30, a flanged top edge 32, a flanged lower edge 34, and a longitudinal length extending between the opposed ends 28 and 30. The support beam 24 is divided along its longitudinal length into a lower beam segment 36 and an upper beam segment 38. As can best be seen in FIG. 5, the lower beam segment 36 has an upper edge 40 that faces and is vertically-aligned with a lower edge 42 of the upper beam segment 38. The facing edges 40 and 42 extend linearly or in another desired pattern, such as sinusoidal, along the entire longitudinal length of the support beam 24.

The lower beam segment 36 is joined to the upper beam segment 38 by a plurality of connectors 44 that are positioned at spaced-apart locations along the longitudinal length of the support beam 24. The connectors 44 serve to stiffen and resist lateral deflection of the lower and upper beam segments 36 and 38 in relation to each other and to transfer the load carried by the upper beam segment 38 to the lower beam segment 36 or to transfer the load carried by the lower beam segment 36 to the upper beam segment 38. The spacing between adjacent connectors 44 may be uniform or the connectors 44 may be more closely spaced in regions where the support beam 24 is subjected to greater stresses or the spacing may be varied as a result of physical interference from other column internals.

Each connector 44 comprises a first bracket 46 that extends along one face of both the lower and upper beam segments 36 and 38 and is secured to the lower beam segment 36 by welding or in any other suitable fashion that allows the first bracket 46 to remain securely fastened to the lower beam segment 36 when subjected to loading forces during operation of the mass transfer column 10. In one embodiment, each connector 44 also includes a second bracket 48 that extends along the opposite face of the lower and upper beam segments 36 and 38 and is secured to the upper beam segment 38 by welding or in any other suitable fashion. The first and second brackets 46 and 48 in each connector 44 are in general horizontal alignment, but are preferably vertically offset as described in greater detail below. The first and second brackets 46 and 48 are formed from metals or other materials having sufficient rigidity to withstand the forces applied to the first and second brackets 46 and 48 during operation of the mass transfer column 10. The first and second brackets 46 and 48 may be of any suitable form, such as U-shaped channels that are positioned with their legs or flanges extending outwardly from the associated face of the upper and lower beam segments 36 and 38.

Some or all of the connectors 44 include a load transferring pin 50 that extends through aligned indexing holes 52 in the first and second brackets 46 and 48 and a hole 54 formed in one or both of the lower and upper beam segments 36 and 38. For example, when the hole 54 is positioned at the longitudinal centerline of the support beam 24, it is formed as a hemispheric notch in the upper edge 40 of the lower beam segment 36 and a hemispheric notch in the lower edge 42 of the upper beam segment 38. The indexing holes 52 and load transferring pin 50 are sized so that the load transferring pin 50 fits tightly within the indexing holes 52. The aligned hole 54 formed in one or both of the lower and upper beam segments 36 and 38 may be slightly larger in diameter than the indexing holes 52 to facilitate assembly of the support beam 24.

Preferably, the indexing holes 52 are positioned in the first and second brackets 46 and 48 so that the load transferring pin 50 causes the facing upper and lower edges 40 and 42 of the lower and upper beam segments 36 and 38, respectively, to be spaced apart a preselected distance. This separation between the lower and upper beam segments 36 and 38 facilitates the assembly of the support beam 24 by preventing the upper and lower edges 40 and 42 from impeding the manual alignment of the indexing holes 52. As a result of this spacing between the lower and upper beam segments 36 and 38, the entire load carried by the upper beam segment 38 is transferred to the lower beam segment 36 through the connectors 44 or vice-versa. For example, when the tray 26 or other internal is supported on the top edge 32 of the upper beam segment 38 and the lower beam segment 36 is supported on the column shell 12, the connectors 44 transfer the load from the upper beam segment 38 to the lower beam segment 36. In another example, when the tray 26 or other internal is supported by the lower beam segment 36 and the upper beam segment 38 is supported on the column shell 12, the connectors 44 transfer the load from the lower beam segment 36 to the upper beam segment 38.

To facilitate disassembly of the support beam 24, the load transferring pin 50 in one embodiment is fixed to one, but not both, of the first and second brackets 46 or 48 by welding or by any other suitable method. Alternatively, the pin 50 can be in the form of a bolt that is secured to the first and second brackets 46 and 48 by a nut threaded on the bolt. Because the load is transferred from the upper beam segment 38 to the lower beam segment 36 primarily through the load transferring pin 50, it is constructed from a metal or other material having sufficient shear strength to withstand the shear forces applied to the load transferring pin 50 when the support beam 24 is fully loaded during operation of the mass transfer column 10.

The connectors 44 each include a plurality of fasteners 56 that extend through aligned holes 58 in the first and second brackets 46 and 48, as well as holes 60 formed in the lower beam segment 36 and upper beam segment 38. The fasteners 56 may include nut and bolt assemblies or other readily removable fastening devices having sufficient strength to resist lateral displacement of the upper beam segment 38 in relation to the lower beam segment 36.

In order to allow passage of the separated lower and upper beam segments 36 and 38 through the open manway 22 in the column shell 12, the first and second brackets 46 and 48 in one embodiment have a height less than the height of the support beam 24. The first and second brackets 46 and 48 each have a sufficient height to overlap the junction between the upper and lower beam segments 36 and 38 while extending along a sufficient portion of the height of the support beam 24 to provide the desired resistance to displacement and deflection of the lower and upper beam segments 36 and 38, while still permitting the lower and upper beam segments 36 and 38 to be passed through the manway 22. Desirably, the first bracket 46 overlaps more of the lower beam segment 36 than the upper beam segment 38 and the second bracket 48 overlaps more of the upper beam segment 38 than the lower beam segment 36. As one example, the first brackets 46 may extend along the full height of the lower beam segment 36 and approximately one-quarter of the height of the upper beam segment 38 and the second brackets 48 may extend along the full height of the upper beam segment 38 and approximately one-quarter of the height of the lower beam segment 36.

Figure 11:
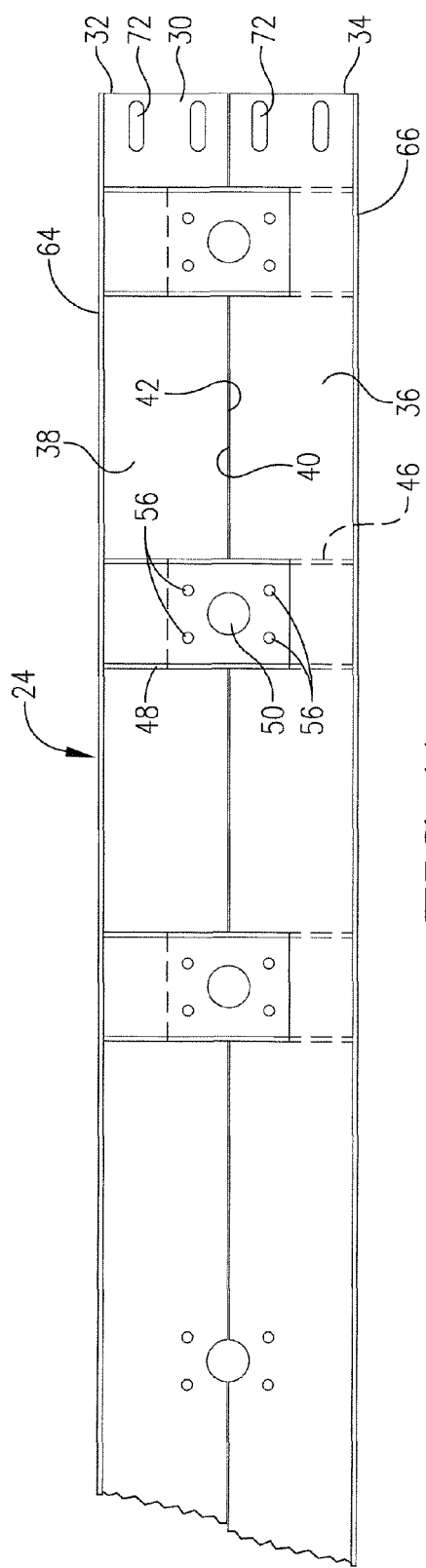
FIG. 11 is a fragmentary side elevation view of another alternate embodiment of the support beam with one of the connectors removed to show details of construction.

In the embodiments of the support beams 24 illustrated in FIGS. 2-10, the support beams 24 include a series of spaced-apart cutouts 62 that reduce the weight of the support beams 24 and allow fluid streams to pass laterally through the support beams 24. The cutouts 62 are shown abutting the connectors 44 and having a hexagonal configuration, but it is to be understood that other positions and configurations can be selected and are within the scope of the present invention. In the embodiment illustrated in FIG. 11, the cutouts are omitted from the support beam 24.

Figure 7:
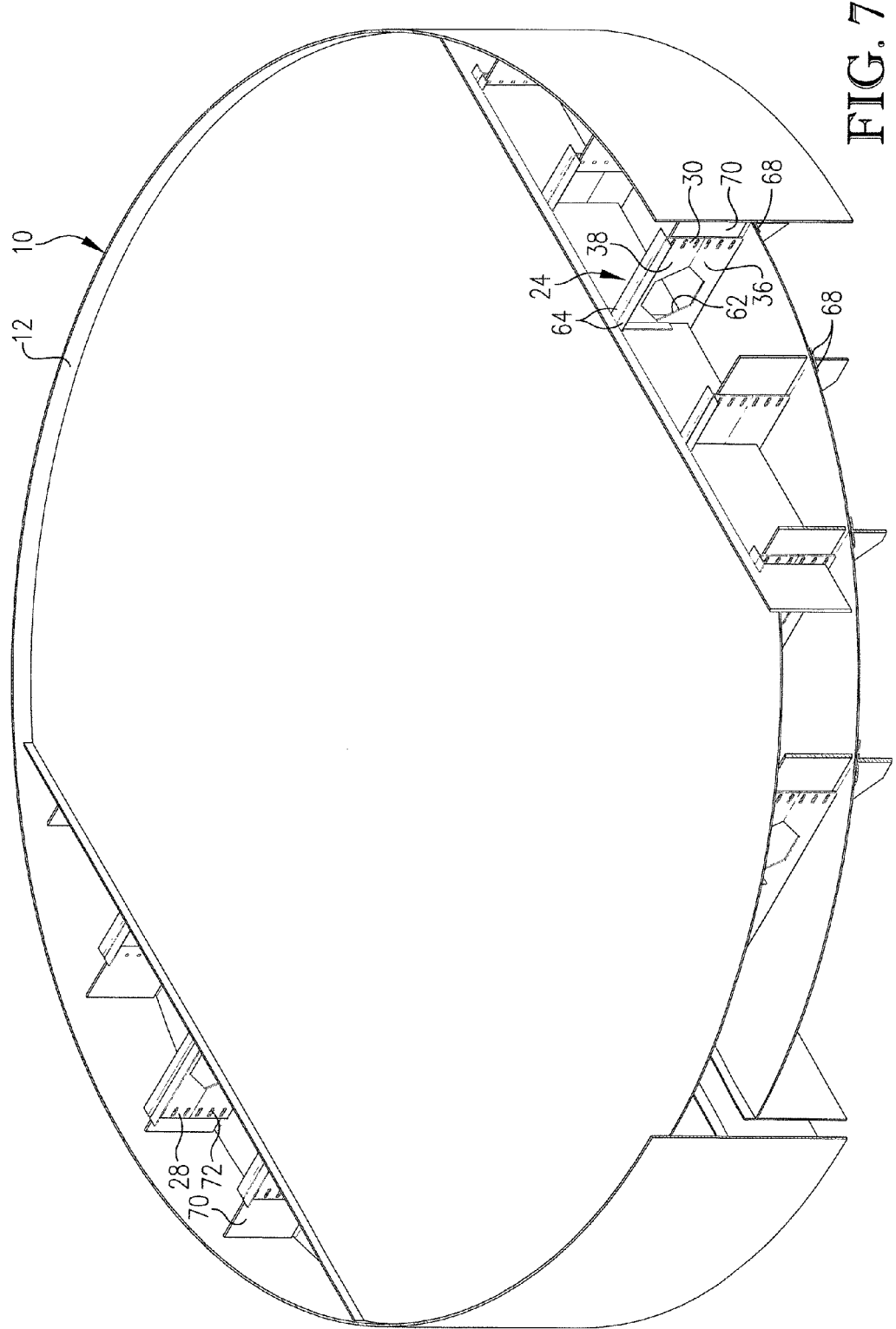
FIG. 7 is a fragmentary perspective view of the column showing two contact trays supported by an alternate embodiment of the support beams.
Figure 8:
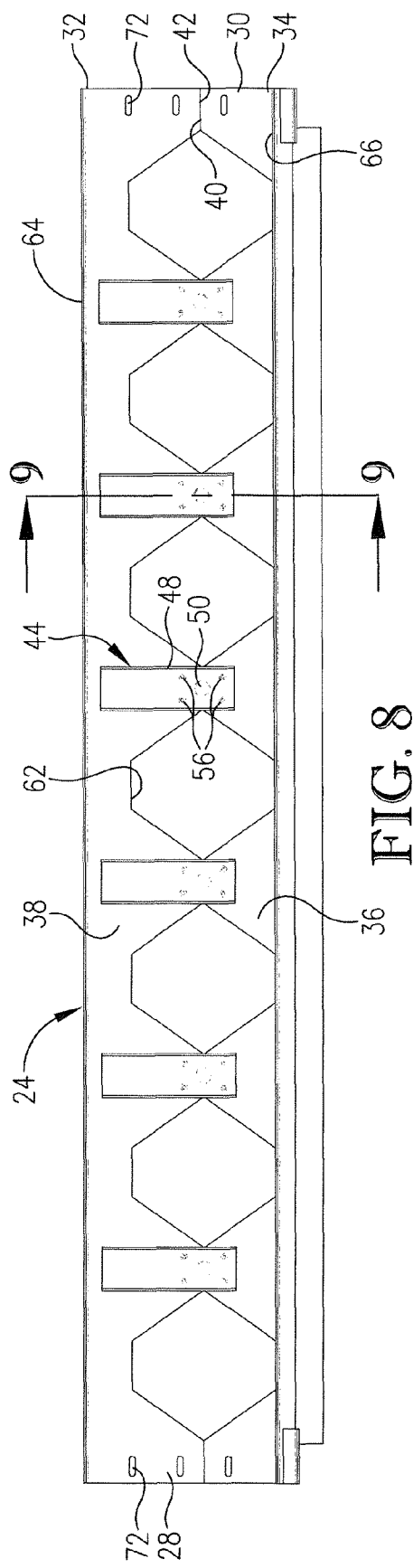
FIG. 8 is a side elevation view of one of the support beams of the alternate embodiment.
Figures 9, 10:
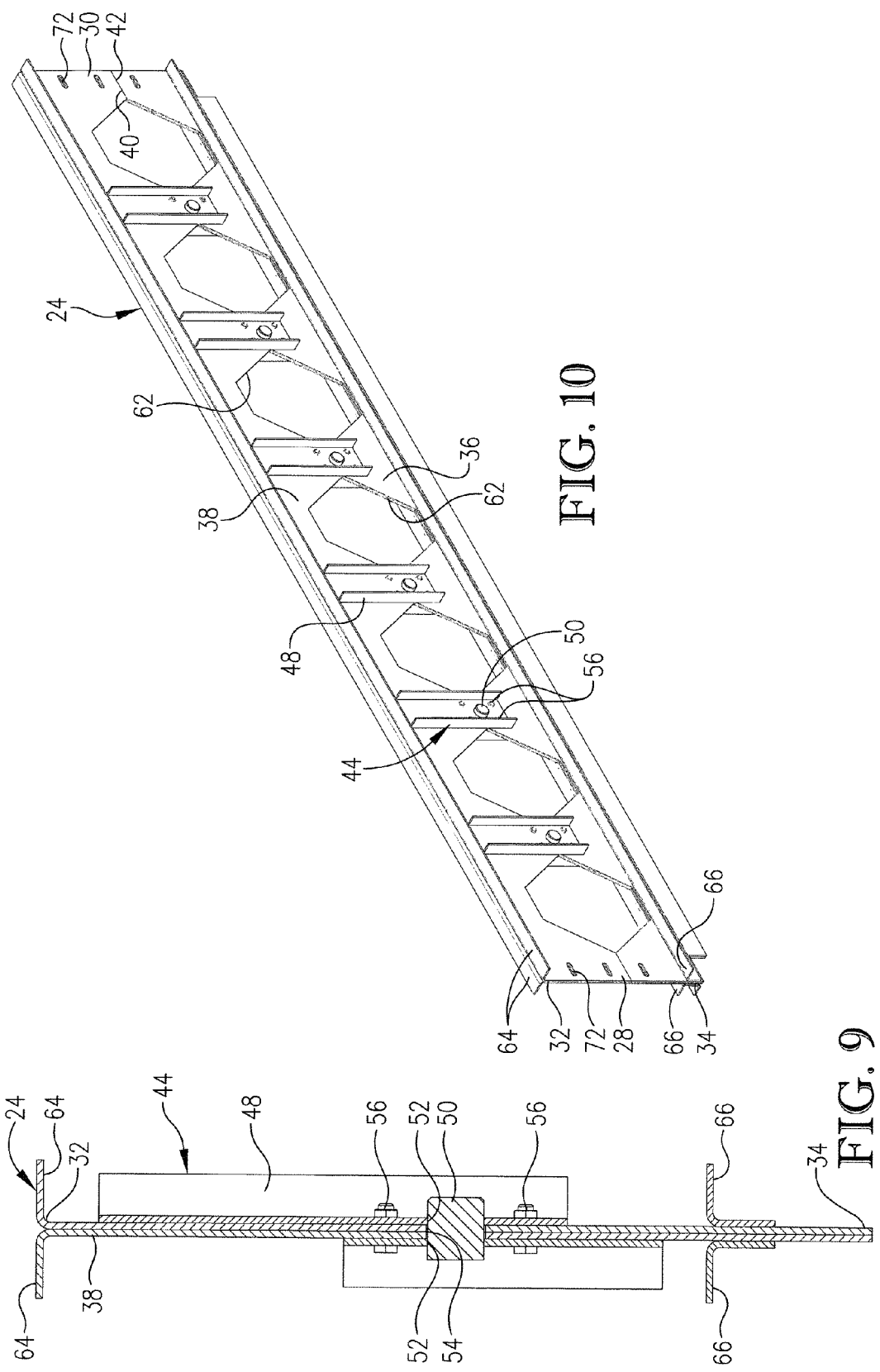
FIG. 9 is an end elevation view of the support beam of the alternate embodiment taken in vertical section along line 9-9 in FIG. 8 to show details of the connector that joins the upper and lower beam segments.
FIG. 10 is a top perspective view of the support beam of the alternate embodiment.
Figure 12:
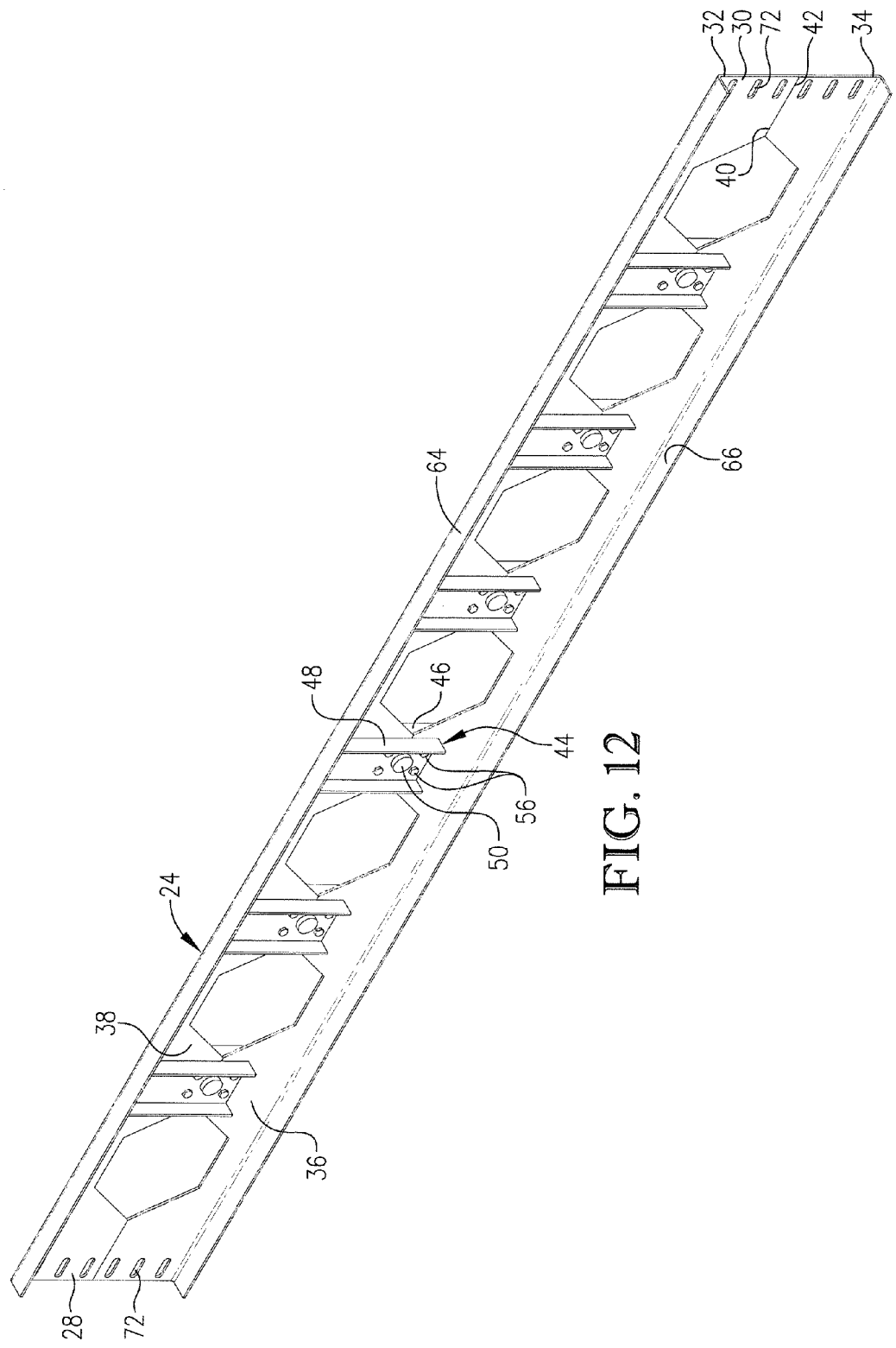
FIG. 12 is a top perspective view of a further embodiment of the support beam.

In the embodiments of the support beams illustrated in FIGS. 2-11, outwardly-extending flanges 64 are positioned at the top edge 32 of the support beams 24 to provide greater surface area to support the trays 26 or other column internals. Outwardly-extending flanges 66 are also positioned at or near the lower edge 34 of the support beams 24 and may serve to support individual panels of a second tray 26 as shown in FIG. 7 in connection with the alternate embodiment of the support beams 24 shown in FIGS. 7-10. The outwardly-extending flanges 66 may also serve to provide a broader base for supporting the opposed ends 28 and 30 of the support beams 24 on seats 68 (FIG. 6) welded or otherwise fixed to the column shell 12. Bolting plates 70 (FIG. 6) are also welded or otherwise fixed to the column shell 12 for further securing of the opposed ends 28 and 30 of the support beams 24 by nut and bolt assemblies (not shown) extending through bolting holes 72 in the ends 28 and 30. In the embodiment of the support beam 24 shown in FIG. 12, only a single flange 64 is provided at the top edge 32 of the support beam 24 and a single flange 66 is provided at the lower edge 34 of the support beam 24. The single flanges 64 and 66 are positioned on the same side of the support beam 24, but may alternatively be placed on opposite sides of the support beam 24.

In another embodiment of the invention, the second bracket 48 can be omitted in each connector 44 and the indexing holes 52 are simply formed in the first bracket 46 and the lower or upper beam segment 36 or 38. In this embodiment, the first brackets 46 can be placed on opposite faces of the lower and upper beam segments 36 and 38 in an alternating or other pattern, with the indexing holes 52 formed in the lower and upper beam segments 36 and 38 in the alternating pattern.

The present invention includes a method of preparing the support beam 24 prior to installation within the mass transfer column 10. The method comprises the steps of forming the connector 44 by temporarily positioning the upper and lower beam segments 36 and 38 in the desired alignment or registration with each other with a slight spacing between the facing top and lower edges 32 and 34, positioning the first bracket 46 along one face of the lower and upper beam segments 36 and 38, positioning the second bracket along an opposite face of the lower and upper beam segments 36 and 38 in general alignment with the first bracket 46, inserting the load transferring pin 50 through the aligned indexing holes 52 in the first and second brackets 46 and 48 and the hole 54 in the lower and/or upper beam segments 36 and/or 38, securing the first bracket 46 to the lower beam segment 36 and the second bracket 48 to the upper beam segment 38, and securing the load transferring pin 50 to either the first or second bracket 46 or 48. The aligned holes 58 and 60 are also formed in the first and second brackets and the lower and upper beam segments, respectively, for receiving fasteners 56 during subsequent assembly of the support beam 24 in the mass transfer column 10. By preparing the support beam 24 in this manner, it can be readily reassembled in the mass transfer column 10 with the connectors 44 returning the lower and upper beam segments 36 and 38 to the alignment achieved during preparation of the support beam 24.

The invention is also directed to a method of assembling the support beam 24 within the mass transfer column 10. The method comprises the steps of passing the separated lower and upper beam segments 36 and 38 through the open manway 22 or another opening in the column shell 12, bringing the lower and upper beam segments 36 and 38 into vertical and longitudinally-extending alignment, inserting the load transferring pin through the hole in the lower beam segment and/or the upper beam segment and then through the indexing hole in the first or second bracket 46 or 48 to which it has not been previously secured, inserting a fastener 56 through the aligned holes 60, and securing the fastener to the first and second brackets 46 and 48. The support beam 24 may be partially secured to the column shell 12 during assembly of the support beam. For example, the lower beam segment 36 may be placed on the seats 68 and bolted to the bolting plates 70 before the upper beam segment 38 is secured to the lower beam segment 36. Alternatively, the support beam 24 may be completely assembled before it is positioned on the seats 68 and bolted to the bolting plates 70. The column 10 may be in a vertically-upright orientation during the assembling of the support beam 24 or it may be in a horizontal or other desired orientation during assembling.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A support beam for supporting an internal within a mass transfer column, said support beam comprising:
   an upper beam segment having opposed ends, a longitudinal length extending between the opposed ends, a lower edge, an upper edge, and opposed first and second faces;
   a lower beam segment having opposed ends, a longitudinal length extending between the opposed ends, a lower edge, an opposed upper edge, and opposed first and second faces; and
   a plurality of connectors securing the upper beam segment and lower beam segment together in longitudinal alignment with the lower edge of the upper beam segment aligned with and facing the upper edge of the lower beam segment,
   wherein each of said connectors comprises:
   a first bracket fixed along the first faces of the lower and upper beam segments;
   a second bracket fixed along the second faces of the lower and upper beam segments; and
   a load transferring pin extending through aligned indexing holes in the first and second brackets and a hole formed in one or both of the lower and upper beam segments.

2. The support beam of claim 1, wherein the lower edge of the upper beam segment is spaced from the facing upper edge of the lower beam segment by the load transferring pin extending through the aligned indexing holes in the first and second brackets.

3. The support beam of claim 2, wherein each of the connectors includes at least one fastener extending through aligned holes in the first and second brackets and another hole formed in either the lower beam segment or the upper beam segment.

4. The support beam of claim 2, wherein each of the connectors includes a first fastener extending through aligned holes in the first and second brackets and a first hole formed in the lower beam segment, and a second fastener extending through additional aligned holes in the first and second brackets and a second hold formed in the upper beam segment.

5. The support beam of claim 4, wherein the first bracket overlaps more of the first face of the lower beam segment than the first face of the upper beam segment and the second bracket overlaps more of the second face of the upper beam segment than the second face of the lower beam segment.

6. The support beam of claim 1, wherein each of the connectors includes a first fastener extending through aligned holes in the first and second brackets and a first hole formed in the lower beam segment, and a second fastener extending through additional aligned holes in the first and second brackets and a second hole formed in the upper beam segment.

7. The support beam of claim 6, wherein the first bracket overlaps more of the first face of the lower beam segment than the first face of the upper beam segment and the second bracket overlaps more of the second face of the upper beam segment than the second face of the lower beam segment.

8. The support beam of claim 1, wherein the first bracket overlaps more of the first face of the lower beam segment than the first face of the upper beam segment and the second bracket overlaps more of the second face of the upper beam segment than the second face of the lower beam segment.

9. The support beam of claim 1, including a plurality of spaced-apart cutouts in the lower and upper beam segments to allow fluid streams to pass laterally through the support beam.

10. A support beam for supporting an internal within a mass transfer column, said support beam comprising:
    an upper beam segment having opposed ends, a longitudinal length extending between the opposed ends, a lower edge, an upper edge, and opposed first and second faces;
    a lower beam segment having opposed ends, a longitudinal length extending between the opposed ends, a lower edge, an opposed upper edge, and opposed first and second faces; and
    a plurality of connectors securing the upper beam segment and lower beam segment together in vertical and longitudinally-extending alignment with the lower edge of the upper beam segment aligned with and facing the upper edge of the lower beam segment in spaced apart relationship,
    wherein each of said connectors comprises:
    a first bracket fixed along the first faces of the lower and upper beam segments;
    a second bracket fixed along the second faces of the lower and upper beam segments;
    a load transferring pin extending through aligned indexing holes in the first and second brackets and a hole formed in one or both of the lower and upper beam segments;
    a first fastener extending through aligned holes in the first and second brackets and a first hole formed in the lower beam segment; and
    a second fastener extending through additional aligned holes in the first and second brackets and a second hole formed in the upper beam segment,
    wherein the first bracket overlaps more of the first face of the lower beam segment than the first face of the upper beam segment and the second bracket overlaps more of the second face of the upper beam segment than the second face of the lower beam segment.

11. The support beam of claim 10, including a plurality of spaced-apart cutouts in the lower and upper beam segments to allow fluid streams to pass laterally through the support beam.

12. A method of preparing a support beam for use in a mass transfer column, said method comprising the steps of:
    positioning upper and lower beam segments in vertical and longitudinally-extending alignment with each other;
    positioning a first bracket along a face of the lower and upper beam segments and a second bracket along an opposite face of the lower and upper beam segments in general alignment with the first bracket;
    inserting a load transferring pin through the aligned indexing holes in the first and second brackets and a hole in the lower and/or upper beam segments;

securing the first bracket to the lower beam segment and the second bracket 48 to the upper beam segment while the load transferring pin is inserted through the indexing holes; and securing the load transferring pin to either the first or second bracket.

13. The method of claim 12, including the step of forming aligned holes in the first and second brackets and the lower and upper beam segments through which fasteners may be inserted.

14. The method of claim 12, wherein said step of position the lower and upper beam segments includes the step of positioning the lower and upper beam segments with a slight spacing between a top edge of the lower beam segment and a facing lower edge of the upper beam segment.

15. A method of installing a support beam in a mass transfer column, said method comprising the steps of:

passing separated lower and upper beam segments through an open manway in a shell of the column;

bringing the lower and upper beam segments into longitudinally-extending alignment, inserting a load transferring pin that is secured to a first bracket secured to one face of the lower beam segment through a hole in the upper beam segment and then through an indexing hole in the second bracket;

inserting a fastener through the aligned holes in the first and second brackets and the lower or upper beam segment; and securing the fastener to the first and second brackets.

16. The method of claim 15, wherein the load transferring pin maintains the lower and upper beam segments in spaced-apart relationship.

17. The method of claim 15, including the step of securing the support beam to the shell of the column.

18. The method of claim 15, including the step of supporting an internal on the support beam.

* * * * *